(12) United States Patent
Cho et al.

(10) Patent No.: US 10,695,706 B2
(45) Date of Patent: Jun. 30, 2020

(54) METHOD AND APPARATUS FOR MEASURING FINE PARTICULATE MATTERS

(71) Applicant: CENTER FOR INTEGRATED SMART SENSORS FOUNDATION, Daejeon (KR)

(72) Inventors: Hyun Tae Cho, Daejeon (KR); Chong Min Kyung, Daejeon (KR); Han Jung Kim, Daejeon (KR)

(73) Assignee: CENTER FOR INTEGRATED SMART SENSORS FOUNDATION, Daejeon (KR)

( * ) Notice: Subject to any disclaimer, the term of this patent is extended or adjusted under 35 U.S.C. 154(b) by 269 days.

(21) Appl. No.: 16/001,046

(22) Filed: Jun. 6, 2018

(65) Prior Publication Data
US 2018/0353891 A1    Dec. 13, 2018

(30) Foreign Application Priority Data
Jun. 9, 2017 (KR) .................. 10-2017-0072322

(51) Int. Cl.
*B01D 46/46* (2006.01)
*G01N 21/94* (2006.01)
(Continued)

(52) U.S. Cl.
CPC ..... *B01D 46/0086* (2013.01); *B01D 46/0068* (2013.01); *B01D 46/442* (2013.01);
(Continued)

(58) Field of Classification Search
CPC .. B01D 46/0086; B01D 46/442; B01D 46/46; B01D 46/0068; B01D 2279/35;
(Continued)

(56) References Cited

U.S. PATENT DOCUMENTS

| 5,810,908 A * | 9/1998 | Gray ..................... B01D 46/46 55/DIG. 34 |
| 6,660,070 B2 * | 12/2003 | Chung ................. B01D 46/008 96/424 |

(Continued)

FOREIGN PATENT DOCUMENTS

| KR | 1168948 | 7/2012 |
| KR | 10-2016-0129573 | 11/2016 |

OTHER PUBLICATIONS

Korean Office Action 10-2017-0072322, dated Aug. 14, 2018. pp. 1-4.

*Primary Examiner* — Minh Chau T Pham
(74) *Attorney, Agent, or Firm* — Bond Schoeneck & King, PLLC; George McGuire; David Nocilly

(57) ABSTRACT

An apparatus for measuring fine particulate matter to determine a time to replace each of a filter and an air quality sensor based on a concentration of a filtered fine particulate matter and a method thereof are provided. The apparatus for measuring fine particulate matter is applied to an air cleaner, a personal environment monitoring system (PEMS), a fine particulate matter module, or the like by sensing a target material, such as harmful gas, as well as particulate matter and fine particulate matter in the air and providing result information.

16 Claims, 9 Drawing Sheets

(51) Int. Cl.
*B01D 46/00* (2006.01)
*G01N 15/06* (2006.01)
*B01D 46/44* (2006.01)
*G01N 15/00* (2006.01)

(52) U.S. Cl.
CPC ......... *B01D 46/46* (2013.01); *G01N 15/0618* (2013.01); *B01D 2279/35* (2013.01); *G01N 2015/0046* (2013.01)

(58) Field of Classification Search
CPC ........... G01N 15/0618; G01N 15/0272; G01N 21/94; G01N 2015/0046; G01N 2015/0096
USPC ...... 55/385.2, 472, 473, DIG. 34; 95/25, 26; 96/417, 422, 424, 397
See application file for complete search history.

(56) References Cited

U.S. PATENT DOCUMENTS

| | | | |
|---|---|---|---|
| 9,764,623 B2* | 9/2017 | Fruehsorger | B60H 3/06 |
| 10,222,077 B2* | 3/2019 | Takei | F24F 11/30 |
| 2006/0187070 A1 | 8/2006 | Liang et al. | |

* cited by examiner

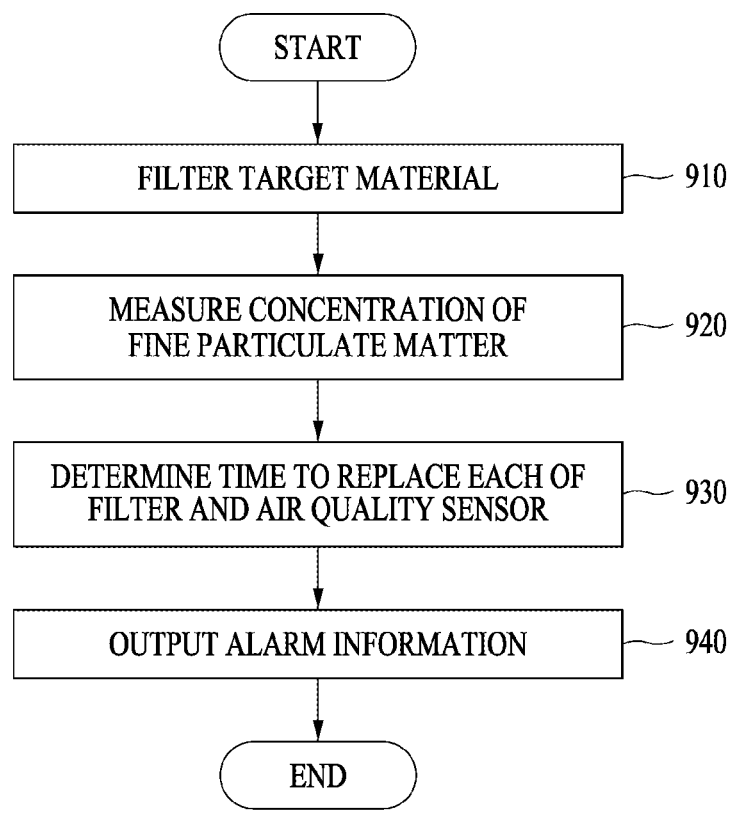

METHOD AND APPARATUS FOR MEASURING FINE PARTICULATE MATTERS

CROSS-REFERENCE TO RELATED APPLICATIONS

A claim for priority under 35 U.S.C. § 119 is made to Korean Patent Application No. 10-2017-0072322 filed on Jun. 9, 2017, in the Korean Intellectual Property Office, the entire contents of which are hereby incorporated by reference.

BACKGROUND

Embodiments of the inventive concept described herein relate to an apparatus for measuring fine particulate matter and a method thereof, and more particularly, relate to technologies of determining a time to replace each of a filter and an air quality sensor based on a concentration of transmitted fine particulate matter.

Fine particulate matter (PM2.5) which exists in the air is injurious to the human body since its particles are smaller than those of particulate matter (PM10). This is introduced into blood through lungs. Long-term exposure to fine particulate matter may cause death due to lung diseases and cardiovascular diseases.

In general, a sensor is used to measure such particulate matter or fine particulate matter harmful to the human body.

The principle of a particulate matter sensor for sensing particulate matter includes irradiating light to particulate matter using an optical sensor (e.g., an infrared light emitting diode (IR LED)) or a laser light source, outputting light scattered by introduced particulate matter as a signal through an optical receiver (e.g., a photodiode), and determining a concentration of particulate matter according to a level of the signal.

Herein, since a conventional particulate matter sensor has a wide air inlet, there is a limit to which target materials (dust and the like), each of which has large particles, as well as particulate matter are introduced into the conventional particulate matter sensor. When target materials, each of which has large particles, are introduced into the conventional particulate matter sensor, the conventional particulate matter sensor does not classify a size of each of the particles and senses and transmits error information.

Further, since particulate matter (PM10) and target materials, each of which has larger particles than the particulate matter (PM10), are introduced together into the conventional particulate matter sensor due to the wide air inlet, it is difficult to measure only a concentration of particles which are smaller than fine particulate matter (PM2.5).

In general, a sensor for sensing particulate matter and fine particulate matter is mainly applied to an air cleaner. The air cleaner is a device which cleans indoor air polluted by dust, germs, and the like through a dust collection operation, a sterilization operation, a deodorization operation, and the like and includes a plurality of filters for cleaning the polluted indoor air.

There is a need to periodically manage and replace a filter to increase the efficiency of the air cleaner and extend the life of the air cleaner. A conventional air cleaner determines a time to replace its filter depending on any one of a running time, difference pressure, the number of rotations of its fan, and a change in quantity of light.

In detail, technologies of counting a running time counts the running time of the air cleaner and displays a time to replace the filter when an accumulated running time (e.g., 6 months, 1 year, 3 years, or the like) arrives at a predetermined time to allow a user to replace the filter. As such, since the conventional air cleaner replaces the filter depending on a running time even if a time to replace the filter varies according to an environment in which the air cleaner is installed, there is a limit to which it is difficult to replace the filter in a proper time.

Further, conventional technologies of an air cleaner for counting a running time are mainly applied to entry-level products and old products. There is a limit to which there is a need for an alarm process of an inaccurate time to replace the filter and a reset process upon replacement of the filter.

SUMMARY

Embodiments of the inventive concept provide an apparatus for measuring fine particulate matter to sense a concentration of fine particulate matter (PM2.5) transmitted from a filter and determine a time to replace each of an air quality sensor and the filter and a method thereof.

Embodiments of the inventive concept provide an apparatus for measuring fine particulate matter to increase the life of the filter using an air pump which assists regeneration of the filter and a method thereof.

Embodiments of the inventive concept provide an apparatus for measuring fine particulate matter to be applicable to an air cleaner, a personal environment monitoring system (PEMS), a fine particulate matter module, or the like by sensing a target material, such as harmful gas, as well as particulate matter and fine particulate matter in the air and providing result information and a method thereof.

According to an aspect of an embodiment, an apparatus for measuring fine particulate matter may include a filter configured to filter an introduced target material, an air quality sensor configured to sense fine particulate matter in the filtered target material and measure a concentration of the fine particulate matter, and a controller configured to determine a time to replace each of the filter and the air quality sensor, based on the measured concentration of the fine particulate matter.

The filter may be configured to be located near an air vent to filter particulate matter (PM10) in the introduced target material to transmit fine particulate matter (PM2.5).

The air quality sensor may be configured to measure a concentration of the fine particulate matter passing through the filter and an accumulated amount of fine particulate matter sensed during a predetermined time.

The controller may be configured to determine the time to replace the air quality sensor, using the ratio of an accumulated amount of particulate matter (PM10) and the measured accumulated amount of fine particulate matter.

The accumulated amount of the particulate matter (PM10) may be measured from particulate matter in the target material sensed during a predetermined time.

The controller may be configured to compare a value of the ratio of the accumulated amounts with a predetermined threshold to determine the time to replace the air quality sensor and output alarm information for notifying a user of the time to replace the air quality sensor according to the determined result.

The apparatus may further include an air pump configured to be located between the air filter and the air quality sensor to assist regeneration of the filter.

The controller may be configured to compare the measured concentration of the fine particulate matter with a predetermined threshold and, when the measured concentration of the fine particulate matter is greater than the predetermined threshold, activate the air pump to remove the target material adsorbed onto the filter.

The controller may be configured to determine the time to replace the filter, based on the frequency of being greater than the threshold during a predetermined time and output alarm information for notifying a user of the time to replace the filter according to the determined result.

According to another aspect of an embodiment, an operation method of an apparatus for measuring fine particulate matter may include filtering an introduced target material using a filter located near an air vent, sensing fine particulate matter in the filtered target material using an air quality sensor and measuring a concentration of the fine particulate matter, and determining a time to replace each of the filter and the air quality sensor, based on the measured concentration of the fine particulate matter.

The filtering of the target material may include filtering particulate matter (PM10) in the introduced target material using the filter to transmit fine particulate matter (PM2.5).

The measuring of the concentration of the fine particulate matter may include measuring a concentration of the fine particulate matter passing through the filter and an accumulated amount of fine particulate matter sensed during a predetermined time.

The determining of the time to replace each of the filter and the air quality sensor may include determining the time to replace the air quality sensor, using the ratio of an accumulated amount of particulate matter (PM10) and the measured accumulated amount of fine particulate matter.

The determining of the time to replace each of the filter and the air quality sensor may include assisting regeneration of the filter using an air pump located between the air filter and the air quality sensor.

The determining of the time to replace each of the filter and the air quality sensor may include comparing the measured concentration of the fine particulate matter with a predetermined threshold and, when the measured concentration of the fine particulate matter is greater than the predetermined threshold, activating the air pump to remove the target material adsorbed onto the filter.

The determining of the time to replace each of the filter and the air quality sensor may include determining the time to replace the filter, based on the frequency of being greater than the threshold during a predetermined time.

The method may further include outputting alarm information for notifying a user of the time to replace each of the filter and the air quality sensor.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 9 is a flowchart illustrating a method for measuring fine particulate matter according to an embodiment of the inventive concept.

DETAILED DESCRIPTION

Figure 1:
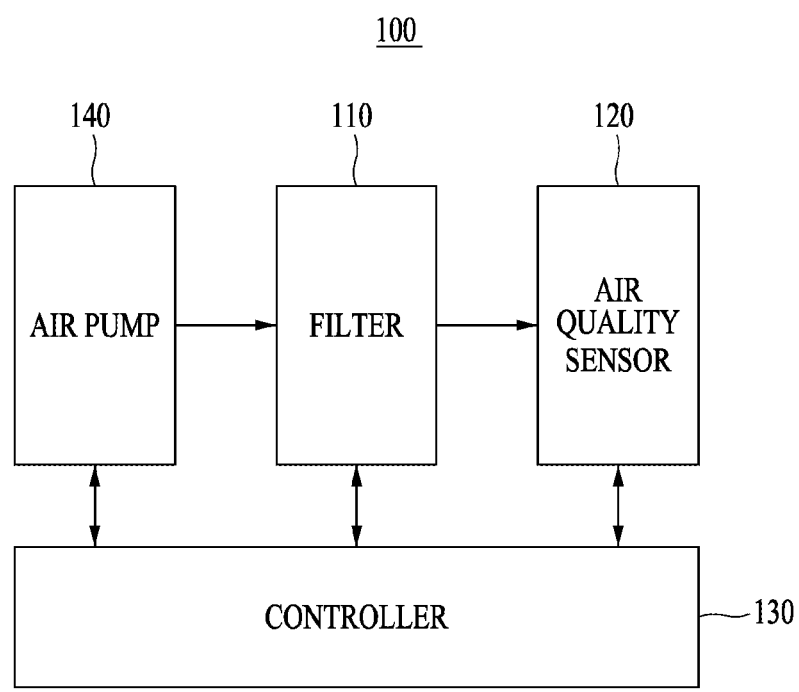
FIG. 1 is a block diagram illustrating a configuration of an apparatus for measuring fine particulate matter according to an embodiment of the inventive concept.

Hereinafter, a description will be given in detail of embodiments with reference to the accompanying drawings. However, the present disclosure is restricted or limited to embodiments of the present disclosure. Further, like reference numerals shown in each drawing indicates like members.

Further, the terminology used in the specification may be terms used to properly represent an exemplary embodiment of the present disclosure and may vary according to intention of a user or an operator or custom of a field included in the present disclosure. Therefore, the terminology will be defined based on contents across the specification.

FIG. 1 is a block diagram illustrating a configuration of an apparatus for measuring fine particulate matter according to an embodiment of the inventive concept.

Referring to FIG. 1, the apparatus for measuring fine particulate matter according to an embodiment of the inventive concept may measure a concentration of fine particulate matter in a target material and may determine a time to replace each of a filter and an air quality sensor.

An apparatus 100 for measuring fine particulate matter according to an embodiment of the inventive concept may include a filter 110, an air quality sensor 120, and a controller 130.

The filter 110 may filter an introduced target material. The target material may be called a harmful substance, harmful gas, and bad smell in the air, such as particulate matter, or a heavy metal or may be fine particulate matter, such as particulate matter (PM10) and fine particulate matter (PM2.5), with small particles. Herein, a kind of a harmful substance, harmful gas, bad smell, or a heavy metal is not limited thereto.

For example, the filter 110 may be located near an air vent to filter particulate matter (PM10) in the introduced target material to transmit fine particulate matter (PM2.5).

According to an embodiment, the filter 110 may be coated with at least one of a conductive polymer, a conductive metal, indium tin oxide (ITO), SnO2:F (FTO), and a graphene membrane, a semiconductor, or a metal material and, in general, may be an electrostatic precipitator filter or a dry or wet filter of removing a harmful substance containing particulate matter from the air.

According to another embodiment, the filter 110 may be configured as at least one of a pre-filter, a medium filter, a high efficiency particulate air (HEPA) filter, or an ultra low penetration air (ULPA) filter or a filter configured with a nanofiber (or a fiber used for a general air cleaner). Herein, a kind, a shape, and material of the filter 110 are not limited thereto.

The air quality sensor 120 may sense fine particulate matter in the filtered target material and may measure a concentration of the fine particulate matter.

The air quality sensor 120 may measure a concentration of fine particulate matter passing through the filter 110 or an accumulated amount of fine particulate matter sensed during a predetermined time.

For example, the air quality sensor 120 may irradiate light to transmitted fine particulate matter using an optical sensor (e.g., an infrared light emitting diode (IR LED)) or a laser light source and may sense light scattered by fine particulate matter through an optical receiver (e.g., a photodiode) to output a signal, thus measuring a concentration of fine particulate matter using a level of the signal.

Further, the air quality sensor 120 may sense a concentration of fine particulate matter during a predetermined time and may measure an accumulated amount of the fine particulate matter. Herein, the time may be in seconds, minutes, or hours. However, since the time is applicable in various ways according to an embodiment of the inventive concept, it is not limited thereto.

The controller 130 may determine a time to replace each of the filter 110 and the air quality sensor 120, based on the measured concentration of the fine particulate matter.

The controller 130 may determine a time to replace the air quality sensor 120 using the ratio of an accumulated amount of particulate matter (PM10) to the measured accumulated amount of the fine particulate matter.

For example, the controller 130 may compare a value of the ratio of the accumulated amounts with a predetermined threshold to determine a time to replace the air quality sensor 120 and may output alarm information for notifying a user of the time to replace the air quality sensor 120 according to the determined result.

Herein, the accumulated amount of the particulate matter (PM10) may be measured from particulate matter in a target material sensed during a predetermined time. This may be a value measured through any sensor (a kind of the sensor is not limited when the any sensor is a sensor which measures dust) in an existing environment in the air or may be a value measured by the air quality sensor 120 in a state where the particulate matter (PM10) does not pass through the filter 110 of the apparatus 100 for measuring fine particulate matter according to an embodiment of the inventive concept.

In detail, the apparatus 100 for measuring fine particulate matter according to an embodiment of the inventive concept may temporarily control to use the filter 110 which transmits fine particulate matter (PM2.5) (may be performed according to a selection input of the user) and may sense the sum of fine particulate matter (PM2.5) and particulate matter (PM10) through the air quality sensor 120. Thus, the apparatus 100 for measuring fine particulate matter may estimate a concentration of each of the fine particulate matter (PM2.5) and the particulate matter (PM10) or an accumulated amount of each of the fine particulate matter (PM2.5) and the particulate matter (PM10) from the sensed sum.

According to an embodiment, the apparatus 100 for measuring fine particulate matter according to an embodiment of the inventive concept may measure fine particulate matter using two algorithms. One of the two algorithms may first sense fine particulate matter (PM2.5) using the air quality sensor 120 in the apparatus 100 and may then measure the sum of the fine particulate matter (PM2.5) and particulate matter (PM10) and the particulate matter (PM10). The other of the two algorithms may first sense the sum of fine particulate matter (PM2.5) and particulate matter (PM10) using the air quality sensor 120 in the apparatus 100 and may then measure the fine particulate matter (PM2.5) and the particulate matter (PM10).

In other words, the apparatus 100 for measuring fine particulate matter according to an embodiment of the inventive concept may directly sense fine particulate matter using the air quality sensor 120 or may sense the sum of fine particulate matter and particulate matter as the filter 110 which filters particulate matter (PM10) is turned on/off.

Thus, referring again to FIG. 1, the controller 130 may calculate a value of the ratio of accumulated amounts using an accumulated amount of fine particulate matter measured by the air quality sensor 120 based on an accumulated amount of predetermined particulate matter measured by any sensor or the air quality sensor 120 and may compare the calculated value of the ratio of the accumulated amounts with a predetermined threshold to determine a time to replace the air quality sensor 120.

Herein, the predetermined threshold may be a limit value of shortening the life of the air quality sensor 120 and causing an error operation and may be preset by the user (or a manager).

For example, when the calculated value of the ratio of the accumulated amounts corresponds to the predetermined threshold or is greater than the predetermined threshold, the controller 130 may determine a current time as a time to replace the air quality sensor 120.

Thus, the controller 130 may output alarm information for notifying the user of the time to replace the air quality sensor 120 according to the determined result.

For example, the apparatus 100 for measuring fine particulate matter according to an embodiment of the inventive concept may further include an output unit (not shown) for outputting the alarm information.

The output unit may provide information about the time to replace the air quality sensor 120. The output unit may output the alarm information such that the user is able to recognize the time to replace the air quality sensor 120 through his or her sense, such as his or her sense of sight, his or her sense of hearing, or his or her sense of touch. The output unit may output different alarm information according to a time to replace the filter 110 and a time to replace the air quality sensor 120.

Herein, the alarm information may be at least one of a warning message, an alarm, a voice, light, and vibration.

According to an embodiment, the output unit may output a warning sound using a buzzer or may turn on/off a warning light using a light emitting diode (LED). Further, a display unit (not shown) may provide a time to replace the air quality sensor 120 by displaying at least one or more guidance information among a numeric value, a value, a percentage, an image, a picture, a graph, a message, and a voice.

According to another embodiment, the controller 130 of the apparatus 100 for measuring fine particulate matter according to an embodiment of the inventive concept may transmit alarm information for notifying the user of a time to replace the air quality sensor 120 according to the determined result to a user terminal via a communication unit (not shown). The controller 130 may transmit information, such as the result of measuring a concentration of fine particulate matter and a time to replace the air quality sensor 120, to an external sensor management server or an air cleaner enterprise server.

The user terminal may refer to a personal computer (PC), a laptop computer, a smartphone, a tablet, a wearable computer, or the like.

Further, the apparatus 100 for measuring fine particulate matter according to an embodiment of the inventive concept may further include an air pump 140.

The air pump 140 may be located between the filter 110 and the air quality sensor 120 to assist regeneration of the filter 110.

For example, the air pump 140 may take off a target material adsorbed onto the filter 110. The air pump 140 may generate strong air from the inside of the apparatus 100 for measuring fine particulate matter to the outside thereof to remove a target material, such as particulate matter, fine particulate matter, or harmful gas, adsorbed onto the outside of the filter 110.

The controller 130 may compare the measured concentration of the particulate matter with a predetermined threshold. When the measured concentration of the particulate matter is greater than the predetermined threshold, the controller 130 may activate the air pump 140 to remove a target material adsorbed onto the filter 110.

Further, the controller 130 may determine a time to replace the filter 110 based on the frequency of being greater than a threshold during a predetermined time and may output alarm information for notifying the user of the time to replace the filter 110 according to the determined result.

For example, the controller 130 may activate the air pump 140 to remove a target material adsorbed onto the filter 110 and may measure a time until a concentration of fine particulate matter measured from the air quality sensor 120 is greater than a threshold. Thus, the controller 130 may determine the life of the filter 110 based on the frequency of being greater than the threshold, which occurs during a constant time.

Herein, the predetermined threshold may be a limit value which shortens the life of the filter 110 and degrades accuracy of filtering fine particulate matter and may be preset by the user (or the manager).

For example, when there is an increase in the frequency of being greater than the threshold during a constant time, the controller 130 may determine a current time as a time to replace the filter 110.

Thus, the controller 130 may output alarm information for notifying the user of the time to replace the filter 110 according to the determined result.

For example, the apparatus 100 for measuring fine particulate matter according to an embodiment of the inventive concept may further include an output unit (not shown) for outputting the alarm information.

The output unit may provide information about a time to replace the filter 110 to the user. The output unit may output alarm information such that the user may recognize a time to replace the filter 110 through his or her sense, such as his or her sense of sight, his or her sense of hearing, or his or her sense of touch. The output unit may output different alarm information according to a time to replace the air quality sensor 120 and a time to replace the filter 110.

Herein, the alarm information may be at least one of a warning message, an alarm, a voice, light, and vibration.

According to an embodiment, the output unit may output a warning sound using a buzzer or may turn on/off a warning light using an LED. Further, a display unit (not shown) may provide a time to replace the air quality sensor 120 by displaying at least one or more guidance information among a numeric value, a value, a percentage, an image, a picture, a graph, a message, and a voice.

According to another embodiment, the controller 130 of the apparatus 100 for measuring fine particulate matter according to an embodiment of the inventive concept may transmit alarm information for notifying the user of a time to replace the filter 110 according to the determined result to the user terminal via the communication unit (not shown). The controller 130 may transmit information, such as the result of measuring a concentration of fine particulate matter and a time to replace the filter 110, to the external sensor management server or the air cleaner enterprise server.

Figure 2:
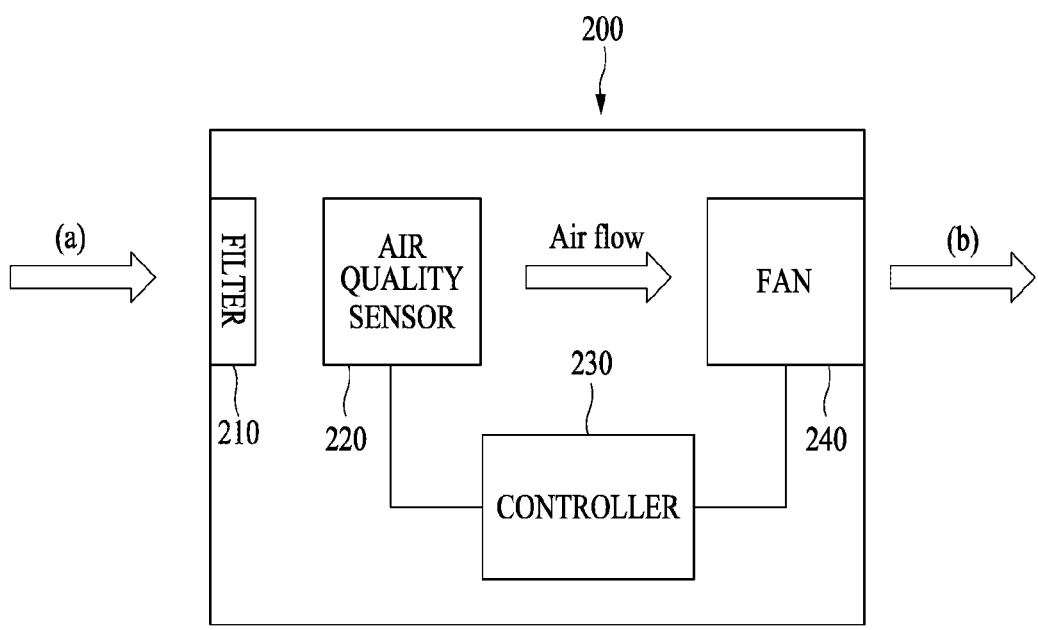
FIG. 2 is a block diagram illustrating an example of a structure of an apparatus for measuring fine particulate matter according to an embodiment of the inventive concept.

FIG. 2 is a block diagram illustrating an example of a structure of an apparatus for measuring fine particulate matter according to an embodiment of the inventive concept.

Referring to FIG. 2, an apparatus 200 for measuring fine particulate matter according to an embodiment of the inventive concept may include a filter 210, an air quality sensor 220, a controller 230, and a fan 240.

In this case, a target material in the air may indicate an air flow from direction (a) to direction (b).

The filter 210 in the apparatus 200 for measuring fine particulate matter according to an embodiment of the inventive concept may filter particulate matter (PM10). The air quality sensor 220 may sense fine particulate matter (PM2.5) in the filtered target material and may measure a concentration of the fine particulate matter (PM2.5). The controller 230 may determine a time to replace each of the filter 210 and the air quality sensor 220, based on the measured concentration of the fine particulate matter (PM2.5). Further, the fan 240 may form the air flow.

Referring to FIG. 2, the filter 210 may be installed near an air vent which is an entrance portion of the apparatus 200 for measuring fine particulate matter to filter particles of particulate matter (PM10) or more to transmit only particles of fine particulate matter (PM2.5) or less. In this case, there may be an important issue of providing a time to replace the filter 210.

For example, when many target materials which are particles of fine particulate matter or more are adsorbed onto the filter 210, the filter 210 may filter fine particulate matter (PM2.5).

A conventional air cleaner may be equipped with a filter, but may fail to accurately measure the life of the filter. Further, the conventional air cleaner may be common to estimate a color change or a usage time of the filter and replace the filter.

In contrast, the apparatus 200 for measuring fine particulate matter according to an embodiment of the inventive concept may monitor the life of the filter 210 according to a used environment and may provide a suitable time to replace the filter 210.

Figure 3:
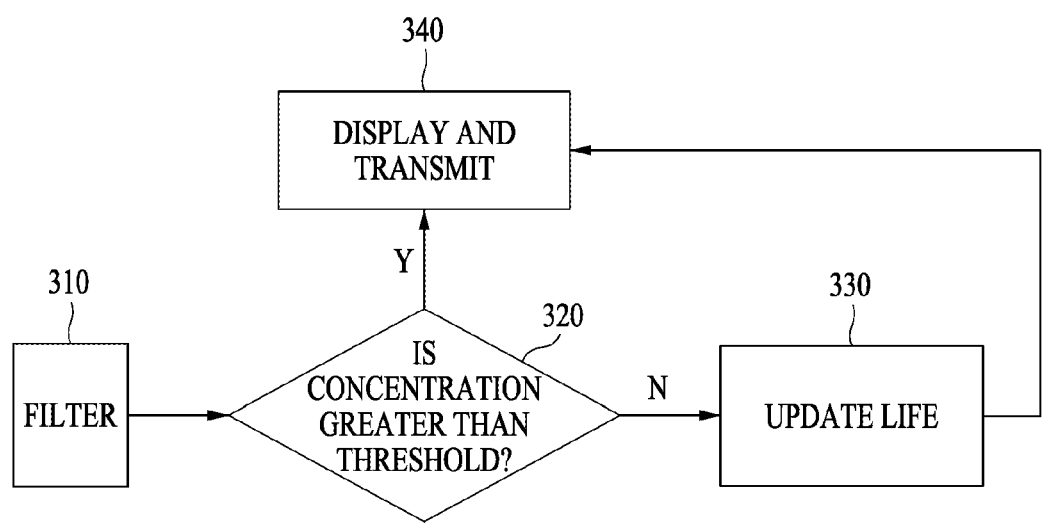
FIG. 3 is a drawing illustrating an example of an algorithm of an apparatus for measuring fine particulate matter according to an embodiment of the inventive concept.

FIG. 3 is a drawing illustrating an example of an algorithm of an apparatus for measuring fine particulate matter according to an embodiment of the inventive concept.

Referring to FIG. 3, in operation 320, the apparatus for measuring fine particulate matter according to an embodiment of the inventive concept may sense fine particulate matter (PM2.5) transmitted from a filter 310 and may determine whether a concentration of the sensed fine particulate matter is greater than a predetermined threshold as a result of comparing the concentration of the sensed fine particulate matter with the predetermined threshold.

According to an embodiment, when the concentration of the fine particulate matter is greater than the threshold in operation 320, in operation 340, the apparatus for measuring fine particulate matter according to an embodiment of the inventive concept may display result information including at least one or more of a concentration value of the fine particulate matter, a time when the fine particulate matter is greater than the threshold, and strength of the fine particulate matter, for replacing the filter 310, on a display unit (not shown) or may transmit the result information to a user terminal or an external server via a communication unit (not shown).

According to an embodiment, when the concentration of the fine particulate matter is less than or equal to the threshold in operation 320, in operation 330, the apparatus for measuring fine particulate matter according to an embodiment of the inventive concept may update the concentration of the sensed fine particulate matter and may store and maintain the updated concentration of the fine particulate matter. When a value of the updated concentration of the fine particulate matter is close to or greater than the life of the filter 310, in operation 340, the apparatus for measuring fine particulate matter according to an embodiment of the inventive concept may display result information including at least one or more of a concentration value of the fine particulate matter, a time when the fine particulate matter is greater than the threshold, and strength of the fine particulate matter, for replacing the filter 310, on the display unit or may transmit the result information to the user terminal or the external server via the communication unit.

In other words, the apparatus for measuring fine particulate matter according to an embodiment of the inventive concept may measure a concentration of fine particulate matter (PM2.5) passing through the filter 310 and may calculate the life of an air quality sensor (not shown) or the filter 310 based on the entire accumulated amount of the concentration.

For example, assuming that the filter 310 may filter fine particulate matter (PM10) of 6000 ug, the apparatus for measuring fine particulate matter according to an embodiment of the inventive concept may calculate the ratio of particulate matter in the air to fine particulate matter (PM2.5) in the air. For example, when the ratio is set to the ratio of 60 (PM10) to 40 (PM2.5), since an accumulated amount of particulate matter (PM10) is 6000 ug when an accumulated amount of fine particulate matter (PM2.5) is 4000 ug, the apparatus for measuring fine particulate matter according to an embodiment of the inventive concept may determine a time to replace the filter 310. In this case, the apparatus for measuring fine particulate matter according to an embodiment of the inventive concept may store a data value of fine particulate matter in a nonvolatile memory and may update the data value in real time in operation 330.

Figure 4:
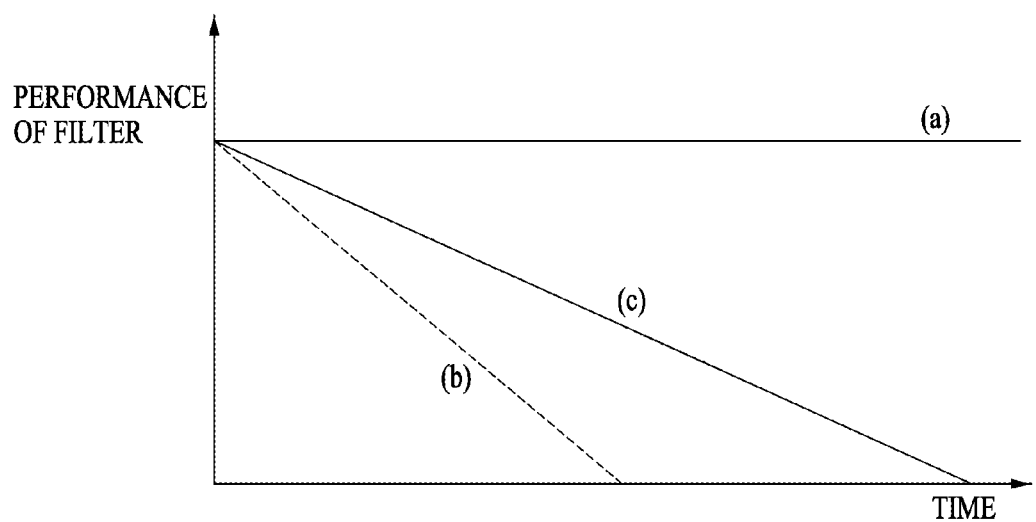
FIG. 4 is a graph illustrating the result of performance of a filter using an apparatus for measuring fine particulate matter according to an embodiment of the inventive concept.

FIG. 4 is a graph illustrating the result of performance of a filter using an apparatus for measuring fine particulate matter according to an embodiment of the inventive concept.

In detail, FIG. 4 is a graph illustrating the result of performance of a filter in various environments. Graph (a) may indicate initial performance of a filter. Graph (b) may indicate performance of the filter exposed to a polluted environment. Graph (c) may indicate performance of the filter exposed to a relatively clean environment.

As shown in FIG. 4, it may be verified that an apparatus for measuring fine particulate matter and a filter which are exposed to a polluted environment with bad air have a shorter life than an apparatus for measuring fine particulate matter and a filter which are exposed to a relatively clean environment.

Thus, departing from the limit of a conventional air cleaner of determining a time to replace a filter depending on an operation time and the number of rotations of a fan, the apparatus for measuring fine particulate matter according to an embodiment of the inventive concept may be more efficient by monitoring a state of a filter in real time to determine the life of the filter and providing a time to replace the filter depending on the determined life of the filter.

Figure 5:
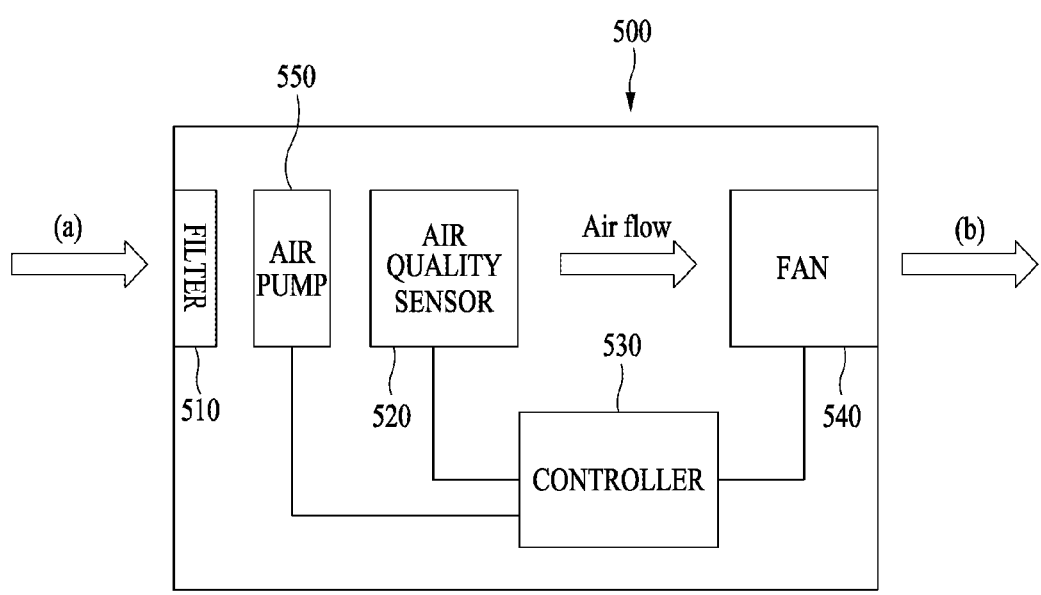
FIG. 5 is a block diagram illustrating an example of a structure of an apparatus for measuring fine particulate matter according to another embodiment of the inventive concept.

FIG. 5 is a block diagram illustrating an example of a structure of an apparatus for measuring fine particulate matter according to another embodiment of the inventive concept.

Referring to FIG. 5, an apparatus 500 for measuring fine particulate matter according to another embodiment of the inventive concept may include a filter 510, an air quality sensor 520, a controller 530, a fan 540, and an air pump 550.

In this case, a target material in the air may indicate an air flow from direction (a) to direction (b).

The filter 510 in the apparatus 500 for measuring fine particulate matter according to another embodiment of the inventive concept may filter particulate matter (PM10). The air quality sensor 520 may sense fine particulate matter (PM2.5) in a filtered target material and may measure a concentration of the fine particulate matter (PM2.5). The controller 530 may determine a time to replace each of the filter 510 and the air quality sensor 520 based on the measured concentration of the fine particulate matter (PM2.5). Further, the fan 240 may form the air flow. The air pump 550 may generate strong air in a direction (from the inside to the outside) opposite to direction (a) to remove a target material, such as particulate matter, fine particulate matter, or harmful gas, adsorbed onto the outside of the filter 510.

Referring to FIG. 5, the filter 510 may be installed near an air vent which is an entrance portion of the apparatus 500 for measuring fine particulate matter to filter particles of particulate matter (PM10) or more to transmit only particles of fine particulate matter (PM2.5) or less. Further, the life of the filter 510 may be extended using the air pump 550.

The apparatus 500 for measuring fine particulate matter according to another embodiment of the inventive concept may extend the life of the filter 510 using the air pump 550 and may monitor filtering of the filter 510 for fine particulate matter through the air quality sensor 520 to determine a time to replace the filter 510.

Figure 6:
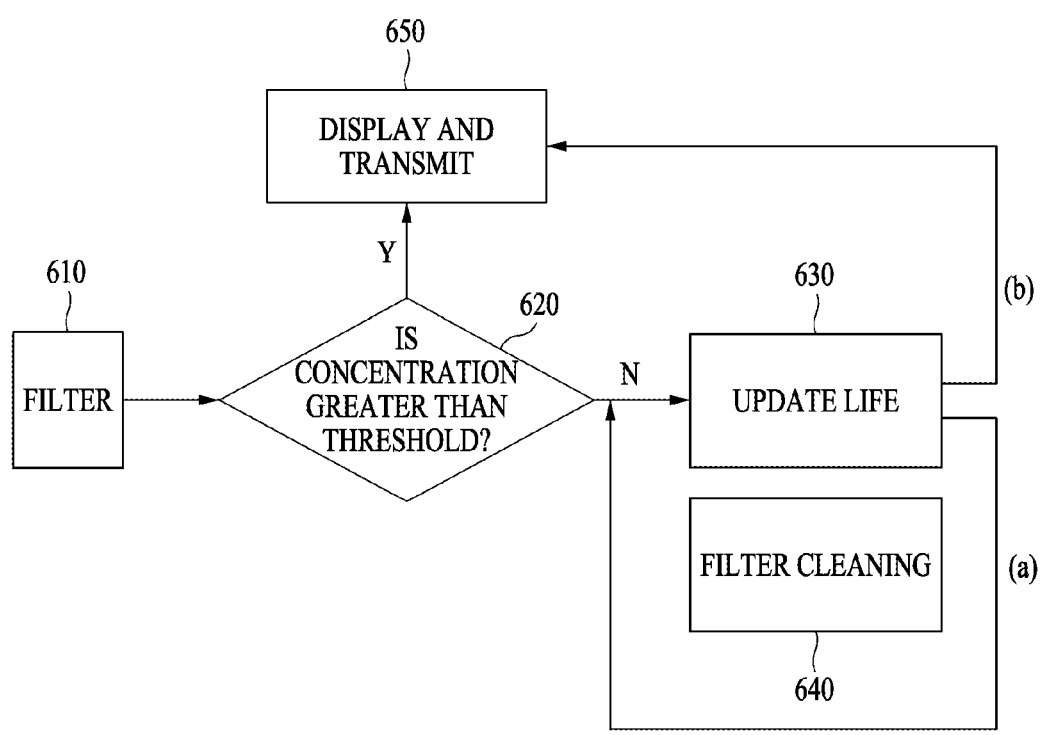
FIG. 6 is a drawing illustrating an example of an algorithm of an apparatus for measuring fine particulate matter according to another embodiment of the inventive concept.

FIG. 6 is a drawing illustrating an example of an algorithm of an apparatus for measuring fine particulate matter according to another embodiment of the inventive concept.

Referring to FIG. 6, in operation 620, the apparatus for measuring fine particulate matter according to another embodiment of the inventive concept may sense fine particulate matter (PM2.5) transmitted from a filter 610 and may determine whether a concentration of the sensed fine particulate matter is greater than a predetermined threshold as a result of comparing the concentration of the sensed fine particulate matter with the predetermined threshold.

According to an embodiment, when the concentration of the fine particulate matter is greater than the threshold in operation 620, in operation 650, the apparatus for measuring fine particulate matter according to another embodiment of the inventive concept may display result information including at least one or more of a concentration value of the fine particulate matter, a time when the fine particulate matter is greater than the threshold, and strength of the fine particulate matter, for replacing the filter 610, on a display unit (not shown) or may transmit the result information to a user terminal or an external server via a communication unit (not shown).

According to an embodiment, when the concentration of the fine particulate matter is less than or equal to the threshold in operation 620, in operation 630, the apparatus for measuring fine particulate matter according to another embodiment of the inventive concept may update the concentration of the sensed fine particulate matter and may store and maintain the updated concentration of the fine particulate matter.

Thereafter, the apparatus for measuring fine particulate matter according to another embodiment of the inventive concept may precede operation (a) to extend the life of the filter 610. For example, when the concentration of the sensed fine particulate matter is less than or equal to the predetermined threshold, the apparatus for measuring fine particulate matter according to another embodiment of the inventive concept may remove a target material adsorbed onto the filter 610 using an air pump through filter cleaning 640 of operation (a). When the concentration of the sensed fine particulate matter is greater than the predetermined threshold, in operation (b), the apparatus for measuring fine particulate matter according to another embodiment of the inventive concept may display result information including at least one or more of a concentration value of the fine particulate matter, a time when the fine particulate matter is greater than the threshold, and strength of the fine particulate matter, for replacing the filter 610, on the display unit or may transmit the result information to the user terminal or the external server via the communication unit.

In other words, the apparatus for measuring fine particulate matter according to another embodiment of the inventive concept may measure a concentration of fine particulate matter (PM2.5) passing through the filter 610 and may calculate the life of an air quality sensor (not shown) or the filter 610 based on the entire accumulated amount of the concentration.

Figure 7:
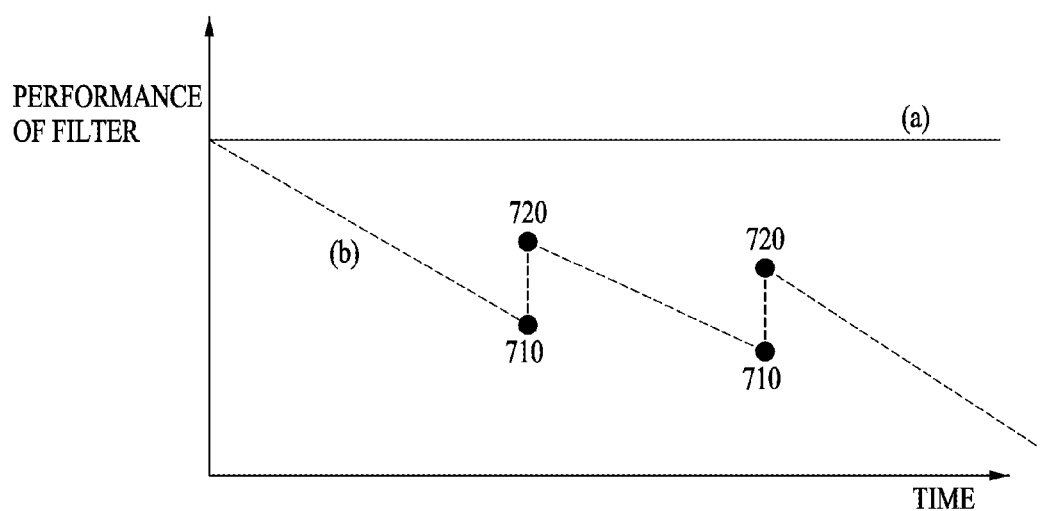
FIG. 7 is a graph illustrating the result of performance of a filter using an apparatus for measuring fine particulate matter according to another embodiment of the inventive concept.

FIG. 7 is a graph illustrating the result of performance of a filter using an apparatus for measuring fine particulate matter according to another embodiment of the inventive concept.

In detail, FIG. 7 is a graph illustrating the result of performance of a filter using an air pump. Graph (a) may indicate initial performance of a filter. Graph (b) may indicate performance of the filter using an air pump.

Referring FIG. 7, reference numeral 710 may indicate a time when a filter is regenerated using an air pump, and reference numeral 720 may indicate the life of the filter, extended through reference numeral 710.

As shown in FIG. 7, when a measured concentration of fine particulate matter is greater than a predetermined threshold, the apparatus for measuring fine particulate matter according to another embodiment of the inventive concept may increase the life of the filter by removing a target material adsorbed onto the filter using the air pump.

Figure 8:
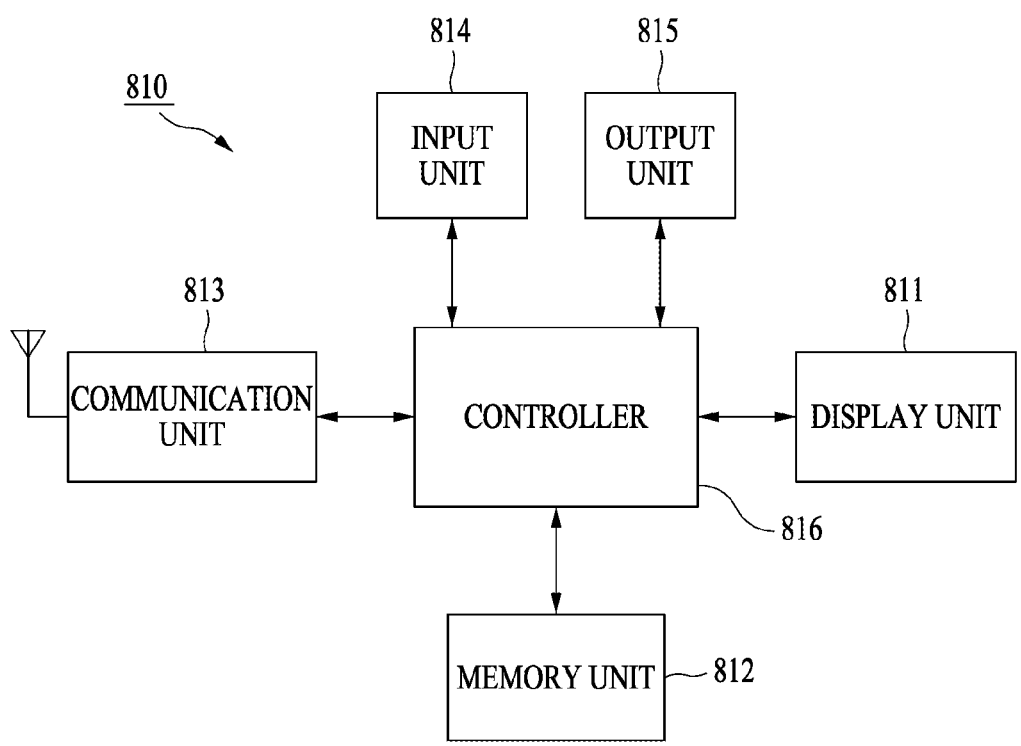
FIG. 8 is a block diagram illustrating a detailed configuration of an apparatus for measuring fine particulate matter according to an embodiment of the inventive concept.

FIG. 8 is a block diagram illustrating a detailed configuration of an apparatus for measuring fine particulate matter according to an embodiment of the inventive concept.

FIG. 8 is only an example of an apparatus 810 for measuring fine particulate matter. However, embodiments are not limited there to. For example, the apparatus 810 for measuring fine particulate matter may include elements which are greater or less than the elements shown in FIG. 8. The apparatus 810 for measuring fine particulate matter may include a configuration in which two or more of the elements shown in FIG. 8 are combined or may include a configuration or arrangement including different elements included in the elements shown in FIG. 8.

Further, the elements shown in FIG. 8 may be implemented with hardware including an integrated circuit specialized in one or more signaling or an application, software, or a combination thereof. The terms "unit" and "-er (or)" may refer to a unit of processing at least one function or operation and may be implemented with hardware, software, or a combination thereof.

Referring to FIG. 8, the apparatus 810 for measuring fine particulate matter according to an embodiment of the inventive concept may include a display unit 811, a memory unit 812, a communication unit 813, an input unit 814, an output unit 815, and a controller 816.

The display unit 811 may display a first screen including a plurality of items respectively located on a plurality of regions and may display a second screen including at least one or more items associated with a function based on a touch-sensitive surface, a sensor, or a set of sensors, which receives an input from a user based on a haptic contact or a tactile touch.

According to an embodiment, the display unit 811 may display a concentration of fine particulate matter, an accumulated amount of fine particulate matter, an accumulated amount of particulate matter, and information for replacing a filter and an air quality sensor through at least one or more items and screens among a numeric value, a value, a percentage, an image, a picture, a graph, a message, and a voice.

According to another embodiment, the display unit 811 may provide a user interface between the apparatus 810 for measuring fine particulate matter and a user.

The memory unit 812 may include a high-speed random access memory (RAM), a magnetic disc, a static RAM (SRAM), a dynamic RAM (DRAM), a read only memory (ROM), a flash memory, or a nonvolatile memory.

The memory unit 812 may include a software module necessary for an operation of the apparatus 810 for measuring fine particulate matter, a set of instructions, or various other data. As an embodiment, the memory unit 812 may store and maintain a concentration of fine particulate matter, an accumulated amount of fine particulate matter, and an accumulated amount of particulate matter.

Further, access to the memory unit 812 may be controlled by another element such as the controller 816 and a peripheral interface.

The communication unit 813 may transmit and receive a radio frequency (RF) signal known as an electromagnetic signal. Further, the communication unit 813 may convert an electrical signal into an electromagnetic signal or may convert an electrical signal from an electromagnetic signal, and may communicate with a communication network and another communication device through an electromagnetic signal.

As an embodiment, the communication unit 813 may include a circuit for performing such a function. The circuit may include, but is not limited to, an antenna system, an RF transceiver, one or more amplifiers, a tuner, one or more oscillators, a digital signal processor, a codec chipset, a subscriber identity module (SIM) card, a memory, or the like.

As an embodiment, the communication unit 813 may communicate with a wireless network, such as a cellular telephone network, a wireless local area network (LAN), and/or a metropolitan area network (MAN), a network, such as an intranet and/or the Internet called a world wide web (WWW), and other devices by wireless communication.

Such wireless communication may include global system for mobile communications (GSM), enhanced data GSM environment (EDGE), wideband code division multiple access (W-CDMA), CDMA, time division multiple access (TDMA), Bluetooth, wireless-fidelity (Wi-Fi) of (IEEE 802.11a, IEEE 802.11b, IEEE 802.11g, IEEE 802.11n, and/or the like), voice over Internet protocol (VoW), worldwide interoperability for microwave access (Wi-MAX), long term evolution (LTE), Zigbee, Z-wave, Bluetooth low energy (BLE), a beacon, a protocol for e-mail, such as an internet message access protocol (IMAP) and/or a post office protocol (POP), instant messaging, such as an extensible messaging and presence protocol (XMPP), a session initiation protocol for instant messaging and presence leveraging extensions (SIMPLE), an instant messaging and presence service (IMPS), or a short message service (SMS), or a communication protocol which is not developed at the time of a filing date of the inventive concept. Herein, a plurality of communication standards, protocols, and technologies, which are not limited thereto, may be used for the above-mentioned wireless communication.

For example, the communication unit 813 may transmit a measured concentration of fine particulate matter, an accumulated amount of the fine particulate matter, an accumulated amount of particulate matter, and information about a time to replace each of a filter and an air quality sensor to an external server or a user terminal.

The input unit 814 may include a keyboard, a touch pad, a dial, a slider switch, a joy stick, or the like and may be combined with any of pointer devices such as an infrared port, a universal serial bus (USB) port, and a mouse.

The output unit 815 may include an audio module, a speaker module, or a vibration module.

As an embodiment, the output unit 815 may output information about a time to replace each of the air quality sensor and the filter to a user through his or her sense, such as his or her sense of sight, his or her sense of hearing, or his or her sense of touch. The output unit 815 may output different alarm information according to a time to replace the filter and a time to replace the air quality sensor.

According to an embodiment, the output unit 815 may output a warning sound using an audio module, a speaker module, or a buzzer, may turn on/off a warning light using an LED, or may output vibration using a vibration module.

The controller 816 may include a processor, a central processing unit (CPU), an application processor, or a communication processor.

For example, the controller 816 may control an operation of the apparatus 810 for measuring fine particulate matter, performed by the display unit 811, the memory unit 812, the communication unit 813, the input unit 814, and the output unit 815.

As an embodiment, the controller 816 may perform an arithmetic operation or data processing about control and/or communication of at least one other element(s) of the apparatus 810 for measuring fine particulate matter.

As an embodiment, the controller 816 may drive an operating system (OS) or an application program to control a plurality of hardware or software elements connected to the controller 816 and may perform a variety of data processing and various arithmetic operations.

For example, the controller 816 may be implemented as a system on chip (SOC). The controller 816 may load a command or data received from at least one of other elements (e.g., a nonvolatile memory) into a volatile memory to process the loaded command or data and may store result data in a nonvolatile memory.

FIG. 9 is a flowchart illustrating a method for measuring fine particulate matter according to an embodiment of the inventive concept.

The method shown in FIG. 9 may be performed by an apparatus 100 for measuring fine particulate matter according to an embodiment of the inventive concept shown in FIG. 1.

In operation 910, the apparatus 100 for measuring fine particulate matter according to an embodiment of the inventive concept may filter an introduced target material using a filter located near an air vent.

Operation 910 may be an operation of filtering particulate matter (PM10) in the target material using the filter to transmit fine particulate matter (PM2.5).

In operation 920, the apparatus 100 for measuring fine particulate matter according to an embodiment of the inventive concept may sense fine particulate matter in the filtered target material using an air quality sensor and may measure a concentration of the fine particulate matter.

Operation 920 may be an operation of measuring a concentration of fine particulate matter passing through the filter and an accumulated amount of fine particulate matter sensed during a predetermined time, using the air quality sensor.

For example, the air quality sensor may irradiate light to transmitted fine particulate matter using an optical sensor (e.g., an IR LED) or a laser light source and may sense light scattered by the fine particulate matter through an optical receiver (e.g., a photodiode) to output a signal, thus measuring a concentration of the fine particulate matter using a level of the signal.

Further, the air quality sensor may sense a concentration of fine particulate matter during a predetermined time and may measure an accumulated amount of the fine particulate matter. Herein, the time may be in seconds, minutes, or hours. However, since the time is applicable in various ways according to an embodiment of the inventive concept, it is not limited thereto.

In operation 930, the apparatus 100 for measuring fine particulate matter according to an embodiment of the inventive concept may determine a time to replace each of the filter and the air quality sensor, based on the measured concentration of the fine particulate matter.

According to an embodiment, operation 930 may be an operation of determining the time to replace the air quality sensor using the ratio of an accumulated amount of particulate matter (PM10) and a measured accumulated amount of fine particulate matter.

According to an embodiment, operation 930 may include an operation (not shown) of assist regeneration of the filter using an air pump located between the filter and the air quality sensor.

In operation 930, the apparatus 100 for measuring fine particulate matter according to an embodiment of the inventive concept may compare the measured concentration of the fine particulate matter with a predetermined threshold. When the measured concentration of the fine particulate matter is greater than the predetermined threshold, the apparatus 100 for measuring fine particulate matter according to an embodiment of the inventive concept may activate the air pump to remove a target material adsorbed onto the filter.

Operation 930 may be an operation of determining the time to replace the filter, based on the frequency of being greater than the threshold during a predetermined time.

Referring to FIG. 9, in operation 940, the apparatus 100 for measuring fine particulate matter according to an embodiment of the inventive concept may output alarm information for notifying the user of the time to replace each of the filter and the air quality sensor.

The alarm information may be at least one of a warning message, an alarm, a voice, light, and vibration for stimulating a sense of the user such as his or her sense of sight, his or her sense of hearing, or his or her sense of touch depending on the time to replace each of the filter and the air quality sensor.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

According to an embodiment of the inventive concept, the apparatus for measuring fine particulate matter may sense a concentration of fine particulate matter (PM2.5) transmitted from a filter and may determine a time to replace each of an air quality sensor and the filter.

Further, according to an embodiment of the inventive concept, the apparatus for measuring fine particulate matter may increase the life of the filter using an air pump which assists regeneration of the filter.

Further, according to an embodiment of the inventive concept, the apparatus for measuring fine particulate matter may be applied to an air cleaner, a personal environment monitoring system (PEMS), a fine particulate matter module, or the like by sensing a target material, such as harmful gas, as well as particulate matter and fine particulate matter in the air and providing result information.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An apparatus for measuring fine particulate matter, the apparatus comprising:
    a filter configured to filter an introduced target material;
    an air quality sensor configured to sense fine particulate matter in the filtered target material and measure a concentration of the fine particulate matter;
    a controller configured to determine a time to replace each of the filter and the air quality sensor, based on the measured concentration of the fine particulate matter; and
    an air pump configured to be located between the filter and the air quality sensor to assist regeneration of air filter.

2. The apparatus of claim 1, wherein the filter is configured to be located near an air vent to filter particulate matter (PM10) in the introduced target material to transmit fine particulate matter (PM2.5).

3. The apparatus of claim 1, wherein the air quality sensor is configured to measure a concentration of the fine particulate matter passing through the filter and an accumulated amount of fine particulate matter sensed during a predetermined time.

4. The apparatus of claim 3, wherein the controller is configured to determine the time to replace the air quality sensor, using the ratio of an accumulated amount of particulate matter (PM10) and the measured accumulated amount of fine particulate matter.

5. The apparatus of claim 4, wherein the accumulated amount of the particulate matter (PM10) is measured from particulate matter in the target material sensed during a predetermined time.

6. The apparatus of claim 4, wherein the controller is configured to:

compare a value of the ratio of the accumulated amounts with a predetermined threshold to determine the time to replace the air quality sensor; and output alarm information for notifying a user of the time to replace the air quality sensor according to the determined result.

7. The apparatus of claim 1, wherein the controller is configured to:

compare the measured concentration of the fine particulate matter with a predetermined threshold; and when the measured concentration of the fine particulate matter is greater than the predetermined threshold, activate the air pump to remove the target material adsorbed onto the filter.

8. The apparatus of claim 7, wherein the controller is configured to:

determine the time to replace the filter, based on the frequency of being greater than the threshold during a predetermined time; and output alarm information for notifying a user of the time to replace the filter according to the determined result.

9. An operation method of an apparatus for measuring fine particulate matter, the method comprising:

filtering an introduced target material using a filter located near an air vent;

sensing fine particulate matter in the filtered target material using an air quality sensor and measuring a concentration of the fine particulate matter; and determining a time to replace each of the filter and the air quality sensor, based on the measured concentration of the fine particulate matter, wherein the determining of the time to replace each of the filter and the air quality sensor comprises determining the time to replace the air quality sensor, using the ratio of an accumulated amount of particulate matter (PM10) and the measured accumulated amount of fine particulate matter.

10. The method of claim 9, wherein the filtering of the target material comprises:

filtering particulate matter (PM10) in the introduced target material using the filter to transmit fine particulate matter (PM2.5).

11. The method of claim 9, wherein the measuring of the concentration of the fine particulate matter comprises:

measuring a concentration of the fine particulate matter passing through the filter and an accumulated amount of fine particulate matter sensed during a predetermined time.

12. The method of claim 11, wherein the determining of the time to replace each of the filter and the air quality sensor comprises:

determining the time to replace the air quality sensor, using the ratio of an accumulated amount of particulate matter (PM10) and the measured accumulated amount of fine particulate matter.

13. The method of claim 9, wherein the determining of the time to replace each of the filter and the air quality sensor comprises:

comparing the measured concentration of the fine particulate matter with a predetermined threshold; and when the measured concentration of the fine particulate matter is greater than the predetermined threshold, activating the air pump to remove the target material adsorbed onto the filter.

14. The method of claim 13, wherein the determining of the time to replace each of the filter and the air quality sensor comprises:

determining the time to replace the filter, based on the frequency of being greater than the threshold during a predetermined time.

15. The method of claim 9, further comprising:

outputting alarm information for notifying a user of the time to replace each of the filter and the air quality sensor.

16. A computer program being stored in a computer-readable storage medium to perform the method of claim 9.

* * * * *